United States Patent [19]

Coquil et al.

[11] Patent Number: 4,531,918

[45] Date of Patent: Jul. 30, 1985

[54] APPARATUS FOR THE INTERPRETATION OF VARIOUS STEPS OF AN INTERACTIVE COMPUTER PROGRAM AND A METHOD OF USING SUCH APPARATUS

[75] Inventors: Bernard Coquil, Chatou; Alain Monta, La Baule, both of France

[73] Assignee: Compagnie Francaise d'Etudes et de Construction "Technip", France

[21] Appl. No.: 586,718

[22] Filed: Mar. 6, 1984

[30] Foreign Application Priority Data

Mar. 11, 1983 [FR] France ............................. 83 04078

[51] Int. Cl.³ .............................................. G09B 19/00
[52] U.S. Cl. .................................................. 434/118
[58] Field of Search ... 364/200 MS File, 900 MS File

[56] References Cited

U.S. PATENT DOCUMENTS

| | | | |
|---|---|---|---|
| 2,498,854 | 2/1950 | Hazel | 434/235 |
| 3,235,977 | 2/1966 | Tusson | 434/405 |
| 3,548,520 | 12/1970 | Warren | 434/181 |
| 3,704,533 | 12/1972 | Weber | 434/181 |
| 3,909,001 | 9/1975 | Feldhausen | 273/270 |
| 3,982,332 | 9/1976 | Szymczak | 434/181 |
| 4,016,659 | 4/1977 | Merrigan | 434/181 |
| 4,285,147 | 8/1981 | Kolar | 40/107 |

FOREIGN PATENT DOCUMENTS

| | | |
|---|---|---|
| 1251565 | 10/1967 | Fed. Rep. of Germany . |
| 2800803 | 7/1979 | Fed. Rep. of Germany . |
| 2435096 | 3/1980 | France . |

Primary Examiner—Gareth D. Shaw
Assistant Examiner—John G. Mills
Attorney, Agent, or Firm—Steinberg & Raskin

[57] ABSTRACT

A user is assisted in accomplishing a technical operation, such as a graph, or the like, by an interactive computer program having an element movable with respect to another element so as to display, at each step of the program, all the information necessary for its execution.

7 Claims, 6 Drawing Figures

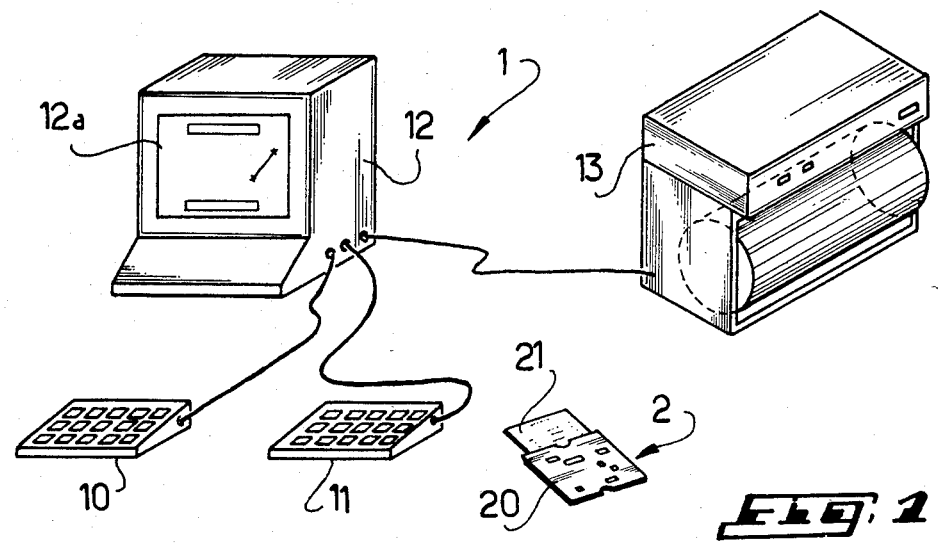
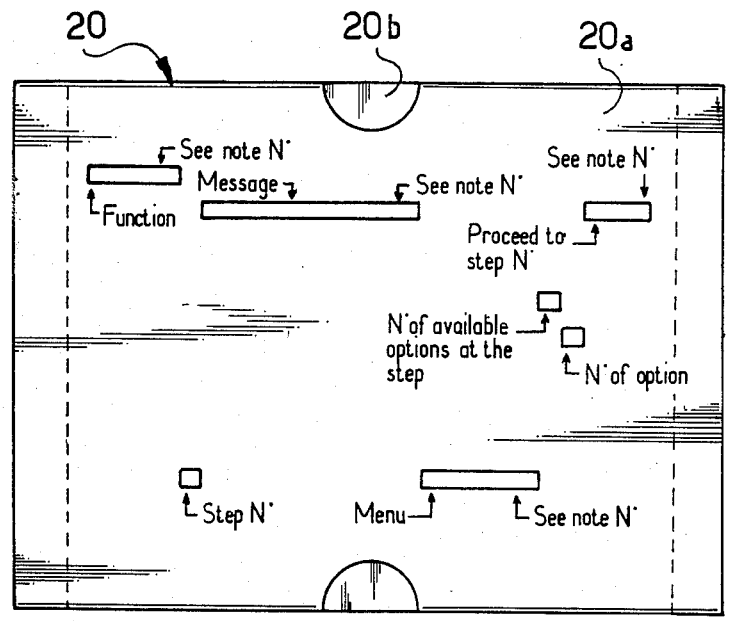

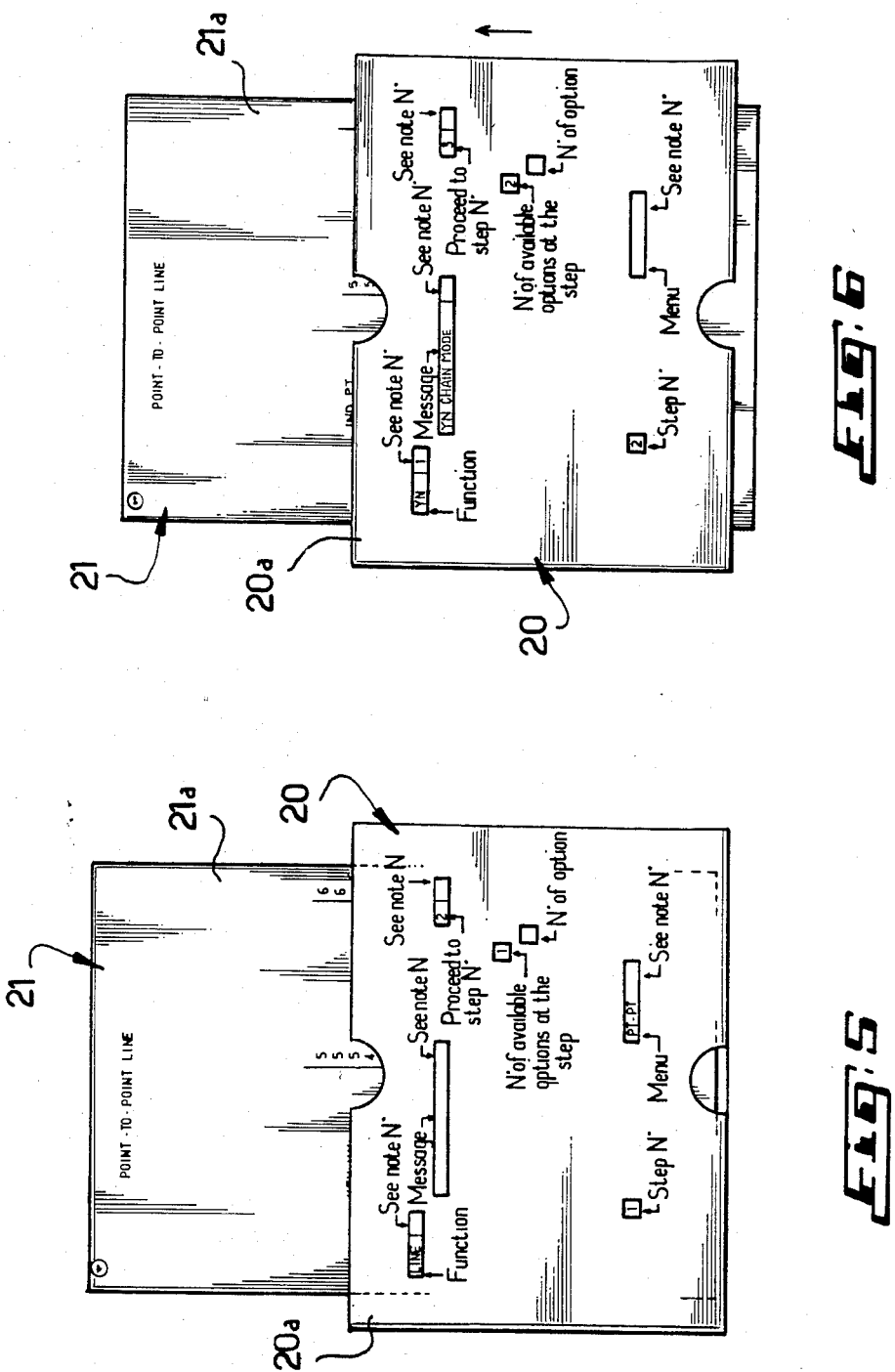

APPARATUS FOR THE INTERPRETATION OF VARIOUS STEPS OF AN INTERACTIVE COMPUTER PROGRAM AND A METHOD OF USING SUCH APPARATUS

BACKGROUND OF THE INVENTION

The present invention relates to apparatus for assisting a user in accomplishing at least one technical operation such as for example a graph, diagram, drawing or the like by means of an interactive computer-program.

Conversational systems are known which are based on a conversational dialogue between a user and the computer with a view to not only relieving such user of some tedious work but also assisting him in design matters.

For example, in case a draftsman wishes to reproduce neatly a freehand drawing, it is sufficient for him to control the computer system according the interactive program including a sequence of steps, and when said steps are accomplished, a printing device is operated to reproduce the drawing.

However, for conversational dialogue to be held between a user and the computer, a perfect knowledge of the interactive program control steps is required. In order to efficiently carry out such types of dialogues, the user must consult the handbook of directions for use of the program, which often is voluminous, thus causing him to perform tedious work resulting in a loss of time.

Moreover, when the user begins to assimilate the manner of holding such a dialogue, some of the steps among the sequence of program control steps may happen to offer him an option between at least two possibilities of execution. The user must then again refer to the handbook for the necessary information for running the program.

SUMMARY OF THE INVENTION

The present invention has for a purpose to remedy the above problems and provides an apparatus allowing the user to be assisted in his dialogue with the computer.

To this end, the invention provides an apparatus for assisting a user to accomplish at least one technical operation such as a graphic or like operation by means of an interactive computer-program including a sequence of steps at least some of which offer an option between at least two possibilities of execution, characterized in that it is constituted by two elements movable with respect to one another constituting a support on which is indicated the information relating to the accomplishment of the operation, such as functions, logic paths, messages, comments and number of available options, and a display element provided with means for selective display of the information, the indications on the said support or medium and the display means being so arranged that the sequence of steps corresponds to a sequence of relative positions of the two elements and that in each position the display means allow all the information relating to the corresponding step to appear simultaneously.

According to another feature of the invention, the information of one and the same type such as the information relating to the functions, the messages or the available options are grouped and arranged in the direction of relative displacement, and the aforesaid display element comprises a number of display means in the form of windows equal in number to the groups, a window being associated with a group element, at each step.

According to still another advantageous feature of the invention, the display element is constituted by a slide displaceable with respect to the support or medium element.

According to still another feature of the invention, the display element and the support or medium element are separable and several support or medium elements are associable with a display element and vice versa.

The present invention also relates to the method of using the apparatus according to the invention in a computer system.

BRIEF DESCRIPTION OF THE DRAWINGS

For a fuller understanding of the invention, reference is made to the following description, taken in connection with the accompanying drawings, in which:

FIG. 1 is a perspective view of a computer system including the apparatus of the invention;

FIG. 2 is a front view of a display element constituted by a slide in the apparatus of the invention;

FIGS. 5 and 6 illustrate by way of example two methods of use of the apparatus of the invention.

DESCRIPTION OF PREFERRED EMBODIMENTS

Figure 3:
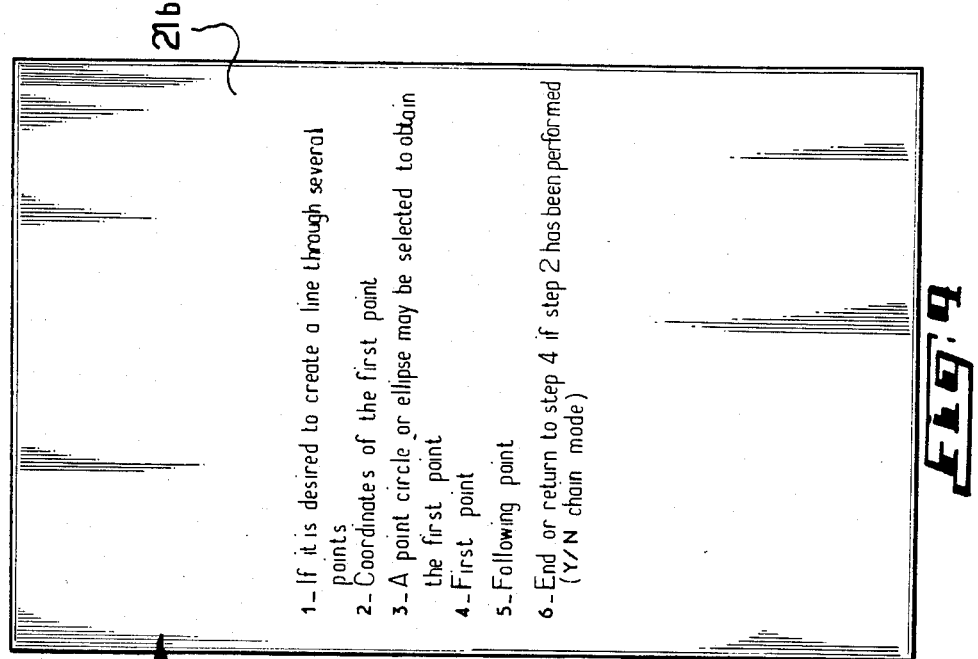
FIGS. 3 and 4 show the front and rear sides, respectively, of a medium element of the apparatus of the invention.

Referring to FIG. 1, there is seen a computer system 1 including a set of two separate keyboards 10 and 11 connected to the display terminal 12 associated with a computer (not shown) controlling a printing or reproducing device 13, e.g. of the drum or cylinder type. The keyboard 10 includes for example function keys, whereas the keyboard 11 is provided with keys for entering the data into the computer system. The two keyboards are shown separately in order to better distinguish them from the terminal but it is quite obvious that they can be integrated into the terminal. Likewise, the printing device may be designed as a single block with the display terminal to thus constitute for example an interactive drawing machine allowing conversational follow-up control of a drawing.

The display screen 12a thus allows a user to conversationally control or follow the running of a program comprising a sequence of steps for accomplishing a technical operation such as a graph, drawing, diagram or the like. The said screen thus displays some of the information furnished by the computer and the technical operation accomplished.

According to the invention, a apparatus 2 is used to additionally facilitate the conversational follow-up control of the drawing to be obtained. More precisely, the apparatus 2 allows a user to distinguish between the various steps of the program to be executed and to opt for one of such steps when two possibilities of execution are offered to him, as will be explained later.

Figure 4:
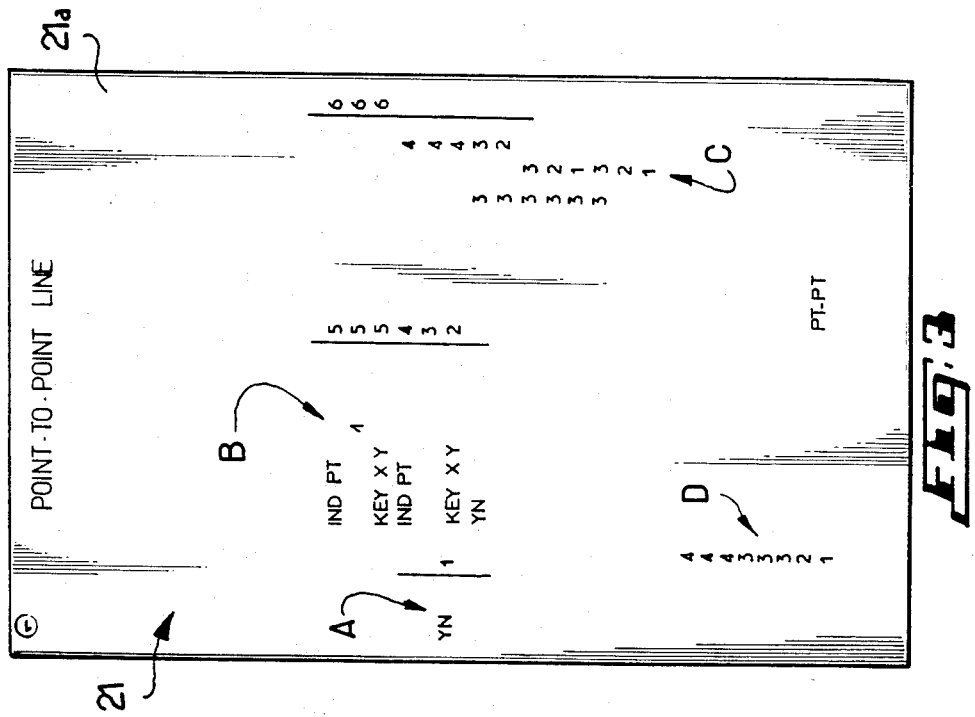

The apparatus 2 is shown in more detail in FIGS. 2 to 4 and is constituted by two elements 20 and 21 which are movable with respect to one another when associated, the element 20 being provided with display means and the element 21 constituting a support or medium element.

As shown in FIG. 2, the element 20 provided with the display means is constituted by an opaque front wall 20a and a transparent back wall 20b. The walls together (e.g. adhesively) so as to define therebetween a passage for the support or medium element 21.

The display means of the element 20 are constituted by a certain number of windows provided in the opaque wall 20a, the said windows being captioned by way of example so that the invention as explained later can be better understood.

The support or medium element 21, e.g. in the form of a card or cardboard fiche bears on its front side 21a a certain number of groups of information relating to the acomplishment of a desired technical operation, whereas indications are written on the rear side 21b of the support element.

The indications on the front side of the medium element 21 are in fact representative of various steps of the functions to be accomplished for correct running of the follow-up conversation according to the interactive program, the comments on the rear side 21b being sometimes necessary for interpreting certain indications of the front side.

The indications on the front side of the support 21 and the display means or windows are so arranged that the sequence of steps of the program corresponds to a sequence of relative positions of the two elements 20 and 21 and that in each position the display means allow all the information relating to the corresponding step to appear simultaneously, as will be explained with reference to FIGS. 5 and 6.

Reference is now made to the said FIGS. 5 and 6 illustrating the cooperation between the two elements 20 and 21 allowing flexible interpretation of the various steps of an interactive program given by way of illustration, it being understood that other, more complex programs can be interpreted by means of the device of the invention.

The interactive program given by way of illustration relates to the construction of a line point to point. Once the computer system has been started, the user holds the support element 21 in such a manner as to pass it between the walls 20a and 20b of the display element 20 which thus constitutes a slide which is displaced with respect to the medium element 21 until the window Step No. displays Step 1. The user then performs what is displayed at the windows function-message-menu, while at the same time looking to see whether, at this step, several options are not proposed (the said options being then indicated on the screen). It should be noted that, at Step 1, the window function displays LINE, whereas the window MENU displays PT-PT (point to point), this being the operation which the user desires to perform. Of course, at this step, the window NB OF AVAILABLE OPTIONS in the step displays a single possible option and the window PROCEED TO STEP No. indicates that the user must proceed to Step No. 2. It should also be noted that the screen of terminal 12 is of the tactile type, i.e. the user can directly opt for or select a logic path (MENU). In the present case, the user has selected PT-PT after having selected the function LINE by depressing the corresponding key of the keyboard 10.

The user thereafter displaces the slide 20 so as to display Step 2 as represented in FIG. 6. There then appears at the window FUNCTION the term YN, whereas the term YN CHAIN MODE appears at the window MESSAGE. The number of available options at this step is therefore two as must be indicated on the screen. The user thus knows that two possible modes are offered to him for constructing lines point to point. The first mode is the "chain mode" which consists of constructing lines point to point beginning with the selection of the end points of the first line and then the selection of a following end point, the resulting lines being connected together. The second mode is the normal mode consisting in constructing the lines point to point by entering the end point of a line, whereafter the program recycles, allowing a new line to be constructed. In this case, the window MESSAGE instructs the user to proceed to the chain mode and the user depresses the key YN of the keyboard 20. It should be noted that the window SEE NOTE No. displays 1, thus leading the user to refer through the transparent wall 20b of the slide to the indications given on the rear side of the support element and bearing the corresponding number 1.

After having interpreted these indications, the user proceeds to Step No. 3 displayed at the corresponding window by moving the slide 20. This step has not be diagrammatized, as also the following steps, but it can be explained as follows. At this step, the displayed number of available options is three, the window No. OF OPTION display 1 and the window MESSAGE displaying the term KEY X,Y. The window SEE NOTE No. displaying 2, this leads the user to refer to the corresponding number on the back side of the support element. From these indications, the user infers that he must indicate the coordinates of the first point. Option No. 2 corresponds, after subsequent displacement of the slide, to the message SEL ELEM which signifies the selection of an element which may be a point, a circle or an ellipse. The window SEE NOTE No. of the window MESSAGE displays 3 to allow the user to refer to point No. 3 on the back of the support element commenting what has been explained previously. This particular method for obtaining the first point is specific to the program and does not need to be discussed since it falls outside the scope of the invention.

By again displacing the slide, the user obtains Option No. 3 of Step 3 and the message displayed at the corresponding window is IND PT, and the user must then refer to the note No. 4 on the back of the support element indicating another method of obtaining the first point. In fact, the user must select on the tactile screen the key allowing him to obtain the point.

After opting for one of the said three messages at Step No. 3, the user displaces the slide 20 so as to display Step No. 4. At this step, and since the mode applied is the chain mode, the user must simply select the following point for obtaining the line. This is indicated at the window MESSAGE by KEY X,Y, a note NO. 5 being displayed at this same window indicating that the following point must be indicated as explained in the corresponding indications on the back of the support element, a note No. 6 being displayed at the extreme right-hand window of the slide indicating either that a line is obtained or a return to Step No. 4 is step number 2 has been executed.

The above example of operation shows the manner in which the slide and the support or medium element are used. It is understood that the information relating to the functions, messages or to the available options indicated at A, B and C, respectively, on the front side of the support element 21 (see FIG. 3), as well as all the other information, are grouped and arranged in the direction of relative displacement of the slide and the support element with respect to one another, the slide being provided with a number of windows which is equal to the number of groups, each window being associated with each group element at each step, the group of steps being besides indicated at D.

The user can therefore, after each step displayed, execute all that is displayed at the windows FUNCTION-MESSAGE-MENU, while at the same time looking to see whether, at this same step, several options are not proposed. Thus, the apparatus of the present invention permits interpreting any information to allow direct conversational follow-up control of the execution of any operation, without therefore requiring the use of a handbook of directions for use.

As shown in the Figures, the slide may be rectangular in shape and is made of plastics material, but, of course, other suitable materials may be used both for the slide and the support or medium element. Moreover, the slide and the support element are separable, several support elements may be associated with a single display element, or, if appropriate, a single support element may be associated with several slides provided a judicious association is obtained for each program between the windows of the slide and the information given on the cards or cardboard fiches.

Instead of being separable, the two elements of the apparatus of the invention may, on the contrary, be unseparable and each of them may be of concentric circular shape, while at the same time allowing their relative displacement with respect to one another.

Of course, each specific technical operation may be stored in a computer storage device, and when all the operations are completed, the content of the storage device may be read so as to reproduce on the printing device 13 a complete drawing.

Furthermore, although the apparatus of the invention has been described as being used with a computer system for a graphic representation, the apparatus may of course be used with any other program whatever its use.

The information, comments, captions, etc. may be written in any language.

The apparatus of the invention therefore allows making any person familiar with the language of any computer program and even assisting a person already initiated in the said language.

What is claimed is:

1. Apparatus for replacing a handbook of directions for use of an interactive program of a computer permitting a user to accomplish at least one technical operation, such as, a graph, or the like, during a conversational dialogue between said user and a computer device under the control of an interactive program including a sequence of steps at least some of which offer an option between at least two possibilities of execution of said operation, said apparatus comprising two elements slidable with respect to each other, a first of said elements constituting a support on which are indicated the instructions for the control of said program relating to the accomplishment of the operation and including the functions of the operation that the program must execute, the numbers of the steps for sequentially accomplishing the operations, the number of available options at each step number, messages indicating actions for introducing data in said computer device, and indications relative to each message, said functions, numbers of steps, number of available options, and messages being grouped independently at different parts on said first element, and a second of said elements having a number of viewing windows equal to the number of groups formed on said first of said elements, one window being associated with each group element when said first and second of said elements are moved sequentially with respect to each other at positions each corresponding to each step whose number is viewed through the associated window, so that at each step the user can view through the windows all the instructions for accomplishing said technical operation.

2. Apparatus as claimed in claim 1, wherein said second of said elements comprises an opaque front wall containing said viewing windows and a transparent rear wall, said front and rear walls being assembled together so as to define therebetween a passage, said first of said elements being inserted into said passage so that said second of said elements is sequentially movable at said positions.

3. Apparatus as claimed in claim 1, wherein said first of said elements is interchangeable from said second of said elements so that several other elements constituting a slidable first element are associable with said second of said elements.

4. Apparatus as claimed in claim 2, wherein said first of said elements is a card having a front side and back side and wherein said instructions relating to the functions, the numbers of steps, the number of available options and the messages are written on said front side of the first of said elements, whereas the instructions relating to said indications are written on said back side and visible through said transparent wall of said second of said elements, so that the user can interpret said messages, after reading said indications.

5. Apparatus for aiding a user to accomplish at least one technical operation, such as, a graph, or the like, during a conversational dialogue between said user and a computer device under the control of an interactive program including a sequence of steps at least some of which offer an option between at least two possibilities of execution of said operation, said computer device including a terminal with a display screen connected, on the one hand, to a keyboard assembly having function keys and keys for entering data for performing said technical operation, the running of the program being displayed on said terminal screen and, on the other hand, to a printing device of said technical operation, said apparatus comprising first and second elements slidable with respect to each other, said first element having a support on which are indicated instructions for the control of said program relating to the accomplishment of the operation and including the functions of the operation that the program must execute, the numbers of the steps for sequentially accomplishing the operation, the number of available options at each step number, messages indicating actions for introducing data in said computer device via said keyboard assembly, and indications relative to each message, said function, numbers of steps, number of available options and messages being grouped independently at different parts of said first element, and said second element having a front wall containing a number of viewing windows equal to the number of groups formed on said first element and a transparent rear wall spaced from said front wall to define a passage through which is movable said first element, one window being associated with each group element when said first and second elements are moved sequentially with respect to each other at positions each corresponding to each step whose number is viewed through the associated window, so that at each step the user can view through the windows and said transparent rear wall all the instructions to accomplish said technical operation during running of the program displayed on said terminal screen, specifically each message in relation to each of the available options, said first element being interchangeable from said second element so that several other elements constituting a slidable first element are associable with said second element.

6. The combination of a computer system having a terminal with a display screen and a keyboard assembly having function keys and keys for entering data, and a printing device connected to said terminal, for allowing a user to conversationally control the running of a program including a sequence of steps for accomplishing a technical operation such as a graph, drawing, diagram, or the like, at least some of said steps offering an option between at least two possibilities of execution of said operation, with apparatus for interpreting the instructions of said program displayed on said terminal screen, said apparatus comprising first and second elements slidable with respect to each other, said first element constituting a support on which are indicated the instructions for the control of said program relating to the accomplishment of the operation and including the functions of the operation that said program must execute, the numbers of the steps for sequentially accomplishing the operation, the number of available options at each step number, messages indicating actions for introducing data in said computer device via said keyboard assembly, and indications relative to each message, said functions, numbers of steps, number of available options, and messages being grouped independently at different parts on said first element, and a second element constituted by a front wall containing a number of viewing windows equal to the number of groups formed on said first element and a transparent rear wall spaced from said front wall to define a passage through which is movable said first element, one window being associated with each group element when said first and second elements are moved sequentially with respect to each other at positions each corresponding to a step whose number is viewed through the associated window, so that at each step the user can view through the windows and said transparent rear wall all the instructions to accomplish said technical operation during running of the program displayed on said terminal screen, specifically, each message in relation to each of the available options, said first element being intechangeable from said second element so that several other elements constituting a slidable first element are associable with said second element.

7. A method of using apparatus for replacing a handbook of directions for use of an interactive program of a computer permitting a user to accomplish at least one technical operation, such as, a graph, or the like, during a conversational dialogue between said user and a computer device under the control of an interactive program including a sequence of steps at least some of which offer an option between at least two possibilities of execution of said operation, said apparatus comprising two elements slidable with respect to each other, a first of said elements constituting a support on which are indicated the instructions for the control of said program relating to the accomplishment of the operation and including the functions of the operations that the program must execute, the numbers of the steps for sequentially accomplishing the operations, the number of available options at each step number, messages indicating actions for introducing data in said computer device, and indications relative to each message, said functions, numbers of steps, number of available options, and messages being grouped independently at different parts on said first element, and a second of said elements having a number of viewing windows equal to the number of groups formed on said first of said elements, one window being associated with each group element when said first and second of said elements are moved sequentially with respect to each other at positions each corresponding to each step whose number is viewed through the associated window, so that at each step the user can view through the windows all the instructions for accomplishing said technical operation, said method comprising the steps of displacing said second element with respect to said first element so as to make one of said viewing windows coincide with the first step number of the program indicated on said first element;

executing the instructions of the first element viewed through said windows;

simultaneously looking to see if at the same step, several options are not proposed; and again displacing said second element for the following step, and so forth, until the steps of the program are fully executed after reading the corresponding instructions.

* * * * *